US007607089B2

(12) United States Patent
Baker et al.

(10) Patent No.: US 7,607,089 B2
(45) Date of Patent: *Oct. 20, 2009

(54) DYNAMIC PRESENTATION GENERATOR

(75) Inventors: John Baker, London (GB); Barry Cooper, Jerusalem (IL); Hakan Ipecki, Chicago, IL (US); James Bicknell Lockhart, IV, New York, NY (US); Dorian Messuti, Buenos Aires (AR); Warner Zee, New York, NY (US)

(73) Assignee: Barclays Capital Inc., New York, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/016,958

(22) Filed: Jan. 18, 2008

(65) Prior Publication Data

US 2008/0178089 A1    Jul. 24, 2008

Related U.S. Application Data

(63) Continuation of application No. 10/812,212, filed on Mar. 29, 2004, now Pat. No. 7,428,704.

(51) Int. Cl.
*G06F 3/00* (2006.01)
*G06F 3/14* (2006.01)

(52) U.S. Cl. .................. 715/730; 715/731; 715/732; 715/765; 707/1

(58) Field of Classification Search ............. 715/705, 715/730–732, 764, 765, 777, 835, 846, 866, 715/908, 964, 202, 204, 234, 235; 707/1
See application file for complete search history.

(56) References Cited

U.S. PATENT DOCUMENTS

| 6,008,807 | A | * | 12/1999 | Bretschneider et al. | 715/732 |
| 7,028,262 | B2 | * | 4/2006 | Estrada et al. | 715/751 |
| 2002/0065848 | A1 | * | 5/2002 | Walker et al. | 707/511 |
| 2002/0087402 | A1 | * | 7/2002 | Zustak et al. | 705/14 |
| 2002/0087496 | A1 | * | 7/2002 | Stirpe et al. | 706/45 |
| 2006/0048058 | A1 | * | 3/2006 | O'Neal et al. | 715/730 |
| 2007/0055939 | A1 | * | 3/2007 | Furlong et al. | 715/731 |

* cited by examiner

*Primary Examiner*—X. L Bautista
(74) *Attorney, Agent, or Firm*—Morgan, Lewis & Bockius LLP

(57) ABSTRACT

A computer aided workstation programmed to facilitate and enhance the process for creating complex graphics and associated presentation design through the use of multiple software tools/agents in conjunction with retail presentation products.

Critical branding/theme characteristics are seamlessly established during the Build process by software/program controls. A high quality, professional presentation can be achieved with minimal training or software knowledge/skill set.

16 Claims, 34 Drawing Sheets

SAMPLE PRESENTATION

*Confidential Presentation to:*

Company XYZ

Opportunities in the E&P Sector

(Sample for PresBuilder)

*December, 2003*

COMPANY XYZ

LEHMAN BROTHERS

FIG. 4

Table of Contents

- Introduction
- Upstream M&A Market Overview
- Transaction Opportunity
- Appendices
  - Comparable Company Analysis
  - Case Study
  - Lehman Brothers' Energy Leveraged Finance Qualifications Agenda

LEHMAN BROTHERS

COMPANY XYZ

FIG. 5

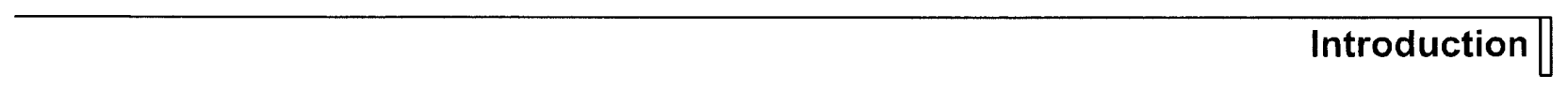

Introduction

FIG. 6

Introduction

Meeting Overview

- Lehman Brothers is pleased to meet with Company XYZ to discuss an opportunities in the exploration and production ("E&P") sector.

- We intend to cover the following topics in our presentation today:
  - An overview of the E&P M&A market
  - A discussion of opportunities with Company Q
  - A review of Lehman Brothers M&A credentials

LEHMAN BROTHERS

COMPANY XYZ

Lehman Brothers Company XYZ Team

Lead Banker has Significant transaction experience.

Lead Banker

*Managing Director,*
*Global Chemicals Group*

Insert Banker Picture Here

| | Title |
|---|---|
| Issuer: | Teligent, Inc. (the Company) |
| Issue: | Senior Notes due 2009 (the Notes) |
| Principal Amount: | $250-$500 million principal amount |
| Registration: | Shelf takedown |
| Assumed Credit Ratings: | Caa1/CCC |
| Interest Rate: | 12_% - 13% payable semi-annually in arrears |
| Interest Escrow: | None required |
| Ranking: | Pari passu with other senior debt of the Company; structurally subordinated to subsidiary debt |

Introduction

| Client | Title |
|---|---|
| | Transaction |
| Issuer: | Teligent, Inc. (the Company) |
| Issue: | Senior Notes due 2009 (the Notes) |
| Principal Amount: | $250-$500 million principal amount |
| Registration: | Shelf takedown |
| Assumed Credit Ratings: | Caa1/CCC |
| Interest Rate: | 12_% - 13% payable semi-annually in arrears |
| Interest Escrow: | None required |
| Ranking: | Pari passu with other senior debt of the Company; structurally subordinated to subsidiary debt |
| Registration: | Shelf takedown |
| Assumed Credit Ratings: | Caa1/CCC |
| Interest Rate: | 12_% - 13% payable semi-annually in arrears |
| Interest Escrow: | None required |
| Ranking: | Pari passu with other senior debt of the Company; structurally subordinated to subsidiary debt |
| Regi tration: | Shelf takedown |

LEHMAN BROTHERS

COMPANY XYZ

Lehman Brothers' M&A Qualifications

Selected Natural Resources Transactions

- Lehman Brothers has also been an active M&A advisor within the broader Natural Resources sector.

FIG. 11

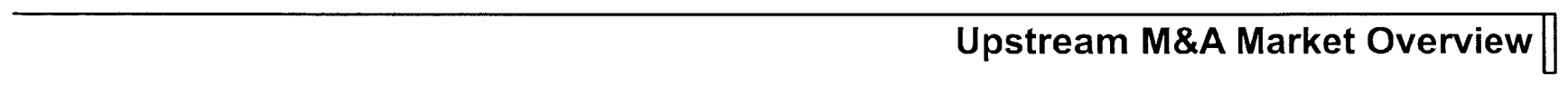

Upstream M&A Market Overview

FIG. 12

Upstream M&A Market Overview

Recent Premiums Paid

- A decline in natural gas prices following the announcement of the Barrett / Williams transaction resulted in lower transaction premiums as well as prices ($/Mcfe).
  - Sellers continue to "look back" to their 52-week highs as floor pricing, though early 2001 highs are fading

Premiums Paid

| Transaction Type | UCL/ PRS | CNQ/ RAX(1) | PCE/ AEC | MHR/ PRZ | BR/ HTR | D/ LD | DVN/ AXL | DVN/ MND | KMG/ HSE | WMB/ BRR(2) |
|---|---|---|---|---|---|---|---|---|---|---|
| % Cash | 0% | 60% | 0% | 15% | 100% | 50% | 100% | 57% | 70% | 50% |
| % Stock | 100% | 40% | 100% | 85% | 0% | 50% | 0% | 43% | 30% | 50% |
| Premium to: | | | | | | | | | | |
| 1 Day Prior to Announcement | 27.0% | 25.4% | 11.8% | 32.6% | 35.9% | 22.0% | 51.5% | 32.3% | 23.9% | 60.0% |
| 5 Day Prior to Announcement | 29.4% | 27.0% | 18.0% | 40.8% | 51.4% | 20.9% | 43.4% | 31.2% | 39.2% | 65.0% |
| 20 Day Prior to Announcement | 24.3% | 31.1% | 8.7% | 41.2% | 51.4% | 32.4% | 41.4% | 39.1% | 41.3% | 47.6% |
| 52-Week High | (5.7%) | (38.9%) | (14.3%) | 1.6% | 16.5% | (14.6%) | 4.7% | (4.8%) | 21.1% | 27.8% |
| Transaction Comparison: | | | | | | | | | | |
| Date of Announcement | 8/20/02 | 5/13/02 | 1/28/02 | 12/18/01 | 10/9/01 | 9/10/01 | 9/4/01 | 8/14/01 | 5/14/01 | 5/7/01 |
| 12-Month Forward Gas Strip | $3.64 | $4.03 | $2.11 | $2.66 | $2.84 | $3.02 | $3.01 | $3.52 | $4.81 | $4.51 |
| $/Mcfe | $1.19 (3) | $1.43 | $0.79 | $0.82 | $1.27 (4) | $1.13 (5) | $1.27 (6) | $1.26 (7) | $1.28 | $1.31 (8) |
| % Gas | 68% | 86% | 42% | 48% | 97% (4) | 89% (5) | 62% (6) | 95% (7) | 79% | 96% (8) |
| R/P (Years) | 10.4 | 5.6 | 15.2 | 12.8 | 7.8 (4) | 13.2 (5) | 9.4 (6) | 7.4 (7) | 14.2 | 17.8 (8) |

- Premiums based on consideration of C$18 per share plus reported value of spun-off subsidiary of C$1.90 per share.
- Premiums based on Barrett stock price on March 7, 2001, one day prior to Shell's unsolicited offer to buy Barrett.
- $70.3 million allocated to non-reserve assets.
- Based on BR's reserve estimates as of year-end 2001 (1,237 Bcfe). After allocation of value to non-proved properties.
- Based on reserve estimates as of 12/31/00 (1,808 Bcfe). After allocation of value to non-proved properties.
- Based on AXL's reserve estimates as of 8/1/01 (3,192 Bcfe). After allocation of value to non-proved properties.
- Based on MND's reserve estimates as of 6/30/01 (2,100 Bcfe). After allocation of value to non-proved properties.
- Based on reserve estimates as of 3/31/01. After allocation of value to non-proved properties.

LEHMAN BROTHERS

COMPANY XYZ

FIG. 14

Transaction Opportunities

FIG. 16

Overview of Company Q

Summary Financial Information

Historical Financials

|  | 2000 | 2001 | LTM |
|---|---|---|---|
| Revenue | $271 | $380 | $316 |
| EBITDE | 288 | 270 | 266 |
| EBIT | 199 | 141 | 115 |
| Net Interest | 11 | 3 | 6 |
| Net Income to Common | 85 | 123 | 76 |
| CFFO | 201 | 358 | 209 |
| Capex | 185 | 368 | 302 |

Balance Sheet Information

|  | 12/31/00 | 12/31/01 | 9/30/02 |
|---|---|---|---|
| Cash | $10 | $9 | $5 |
| Net PP&E | 705 | 939 | 988 |
| Total Assets | 837 | 1,059 | 1,074 |
| Total Debt | $245 | $244 | $247 |
| Preferred Equity | - | - | - |
| Minority Interest | - | - | - |
| Common Equity | 397 | 566 | 566 |
| Book Capitalization | $642 | $810 | $813 |
| *Total Debt/Total Book Cap.* | *38.2%* | *30.1%* | *30.4%* |
| *Net Debt/Net Book Cap.* | *37.2%* | *29.4%* | *29.9%* |

Transaction Opportunities

Trading Information

| | | Data | Multiple | Peer Median |
|---|---|---|---|---|
| Common Stock Price (11/29/02) | | $31.30 | | |
| Shares Outstanding (MM) | | 30.7 | | |
| "In the Money" Options | | 0.4 | | |
| Market Value | | $975 | | |
| Net Debt & Pfd. | | 268 | | |
| Net Market Capitalization | | $1,243 | | |
| Equity Value as a Multiple of: | | | | |
| EPS[1]. | 2003E | $2.45 | 12.8 x | 21.2 x |
|  | 2004E | $2.55 | 12.3 x | 30.5 x |
| CFPS[1]. | 2003E | $8.45 | 3.7 x | 4.4 x |
|  | 2004E | $8.70 | 3.6 x | 4.0 x |
| Book Value: | | $566 | 1.7 x | 1.9 x |
| Net Market Cap. as a Multiple of: | | | | |
| Net PP&E: | | $988 | 1.3 x | 1.2 x |
| EBITDE[1]. | 2003E | $296 | 4.2 x | 5.2 x |
|  | 2004E | $303 | 4.1 x | 5.4 x |
| Reserves ($/Mcfe): | | 734 | $1.69 | $1.13 |

• *Estimates per Lehman Brothers equity research*

LEHMAN BROTHERS

COMPANY XYZ

FIG. 20

Overview of Company Q

Transaction Opportunities

Officers, Directors and Shareholders

Officers

| Name | Title |
|---|---|
| William G. Hargett | President and CEO |
| Charles W. Adcock | SVP and General Manager, Offshore Division |
| Steven L. Mueller | SVP and General Manager, Offshore Division |
| Tracy Price | SVP Land |
| Roger B. Rice | VP, Human Resources and Administration |
| Thomas E. Schwartz | VP, Geophysics |
| James F. Westmoreland | VP, Chief Accounting Officer and Secretary |

Directors

| Name | Title |
|---|---|
| Robert B. Catell | Chairman |
| William G. Hargett | President and CEO |
| Gordon F. Ahalt | President, GFA Inc. |
| David G. Elkins | President and Co-CEO, Sterling Chemicals, Inc. |
| Russell D. Gordy | Managing General Partner, S.G. Interests |
| Gerald Luterman | EVP and CFO KeySpan |
| H. Neil Nichols | President, KeySpan Energy Development Corp. |
| James Q. Riordan | Retired Vice Chairman and CFO, Mobil |
| Donald C. Vaughn | Retired Vice Chairman, Halliburton |
| Robert J. Fani | President, KeySpan Energy Services |

Shareholders (1)

| Major Institutional Shareholders | Held | % of Total |
|---|---|---|
| Keyspan Energy Corp | 20,380,392 | 66.4% |
| MFS Investment Management | 2,479,096 | 8.1% |
| Dimensional Fd Advisors, Inc. | 1,135,900 | 3.7% |
| Dalton Greiner Hartman Maher | 879,835 | 2.9% |
| Legg Mason Fds Mgmt, Inc. | 784,180 | 2.6% |
| Westport Asset Management Inc. | 665,500 | 2.2% |
| Barclays Gbl Investors, N.A. | 569,974 | 1.9% |
| Fleet Invt Advisors, Inc. | 459,100 | 1.5% |
| Mellon Private Asset Mgmt | 327,208 | 1.1% |
| Principal Cap Investors, Llc | 292,646 | 1.0% |
| Vanguard Group | 223,589 | 0.7% |
| Westwood Management Corp. | 189,700 | 0.6% |
| Numeric Investors, L.P. | 186,808 | 0.6% |
| Muhlenkamp And Company Inc. | 180,600 | 0.6% |
| State Str Global Advr | 160,584 | 0.5% |
| Total | 28,915,112 | 94.2% |
| Officers and Directors | 215,326 | 0.7% |
| Other | 1,562,457 | 5.1% |
| Total Shares Outstanding | 30,692,895 | 100.0% |

- Data based on Shareworld ownership data and available public filings.

LEHMAN BROTHERS

COMPANY XYZ

FIG. 21

Appendices

FIG. 22

Comparable Company Analysis

FIG. 23

Comparable Company Analysis

E&P Companies

| Company Name: | AAA Co. | BBB Co. | CCC Co. | DDD Co. | EEE Co. | FFF Co. | GGG Co. | HHH Co. | III Co. | JJJ Co. | Median |
|---|---|---|---|---|---|---|---|---|---|---|---|
| Ticker Symbol: | AAA | BBB | CCC | DDD | EEE | FFF | GGG. | HHH | III. | JJJ | |
| Current Stock Price as of 11/29/02: | $47.20 | $53.88 | $42.12 | $45.79 | $38.77 | $45.25 | $18.84 | $24.66 | $29.65 | $23.95 | |
| Equity Market Value ($MM): | $11,804 | $7,844 | $8,480 | $7,212 | $4,578 | $4,542 | $3,409 | $2,931 | $7,647 | $3,074 | |
| Net Market Capitalization ($MM): | $17,443 | $10,505 | $12,114 | $14,831 | $5,809 | $9,451 | $4,755 | $4,557 | $9,423 | $4,204 | |
| Equity Market Value as a Multiple of: | | | | | | | | | | | |
| DCFPS      LTM | 6.4 x | 5.5 x | 6.3 x | 4.5 x | 6.2 x | 3.3 x | 5.4 x | 7.8 x | 4.5 x | 5.8 x | 5.7 x |
| 2002E | 5.8 x | 5.1 x | 6.1 x | 3.9 x | 6.1 x | 4.4 x | 4.8 x | 7.5 x | 4.1 x | 5.8 x | 5.4 x |
| 2003E | 5.4 x | 4.8 x | 5.5 x | 3.6 x | 5.5 x | 4.0 x | 4.7 x | 4.4 x | 4.0 x | 5.7 x | 4.7 x |
| 2004E | 5.3 x | 5.1 x | 5.4 x | 3.5 x | 5.3 x | 4.1 x | 4.6 x | 4.2 x | 4.4 x | 6.0 x | 4.8 x |
| EPS:        LTM | 19.2 x | 17.2 x | NM | 14.4 x | NM | NM | 23.2 x | NM | 3.4 x | 16.3 x | 16.8 x |
| 2002E | 15.7 x | 13.8 x | 22.2 x | 13.5 x | 43.1 x | 19.3 x | 17.9 x | 44.8 x | 16.9 x | 15.5 x | 17.4 x |
| 2003E | 13.7 x | 13.8 x | 21.1 x | 10.1 x | 22.2 x | 15.6 x | 17.1 x | 9.3 x | 14.5 x | 14.5 x | 14.5 x |
| 2004E | 15.0 x | 16.8 x | 21.6 x | 10.2 x | 23.5 x | 18.1 x | 20.9 x | 10.7 x | 20.4 x | 17.1 x | 17.6 x |
| Book Value: | 1.8 x | 1.7 x | 2.3 x | 1.6 x | 3.0 x | 1.6 x | 2.2 x | 2.1 x | 2.1 x | 3.5 x | 2.1 x |
| Enterprise Value as a Multiple of: | | | | | | | | | | | |
| EBITDE:    LTM | 7.6 x | 6.1 x | 7.4 x | 6.4 x | 7.4 x | 6.4 x | 6.9 x | 11.6 x | 2.5 x | 7.8 x | 7.1 x |
| 2002E | 6.8 x | 5.5 x | 6.8 x | 6.1 x | 7.7 x | 5.2 x | 6.0 x | 9.6 x | 4.2 x | 7.6 x | 6.4 x |
| 2003E | 6.3 x | 5.4 x | 6.3 x | 5.6 x | 6.1 x | 5.6 x | 5.5 x | 5.6 x | 4.0 x | 6.8 x | 5.6 x |
| 2004E | 6.3 x | 5.7 x | 6.2 x | 5.3 x | 6.0 x | 5.8 x | 5.6 x | 5.5 x | 4.4 x | 7.1 x | 5.7 x |
| Net PP&E: | 1.2 x | 1.3 x | 1.4 x | 1.4 x | 1.8 x | 1.3 x | 1.5 x | 1.5 x | 1.2 x | 1.8 x | 1.4 x |
| Market Value of Reserves as a Multiple of: | | | | | | | | | | | |
| Proved Reserves (6:1)    MMBOE | $7.51 | $8.29 | $6.10 | $8.42 | $8.22 | $5.28 | $7.91 | $6.56 | $4.95 | $8.46 | $7.71 |
| Bcfe | $1.25 | $1.38 | $1.02 | $1.40 | $1.37 | $0.88 | $1.32 | $1.09 | $0.83 | $1.41 | $1.29 |
| SEC Value:    After-Tax | 2.2 x | 1.9 x | 2.0 x | 2.3 x | 2.3 x | 1.5 x | 1.7 x | 1.8 x | 1.7 x | 2.8 x | 2.0 x |
| Pre-Tax | 1.5 x | 1.4 x | 1.4 x | NA | 1.7 x | 1.1 x | 1.4 x | 1.6 x | 1.2 x | 2.2 x | 1.4 x |
| Proved Reserves / 2001 Production | 11.7 yrs | 10.1 yrs | 13.8 yrs | 8.6 yrs | 10.4 yrs | 13.3 yrs | 11.0 yrs | 16.2 yrs | 9.5 yrs | 13.7 yrs | 11.4 yrs |
| % Gas | 50.7% | 52.7% | 68.8% | 65.8% | 89.7% | 45.7% | 49.3% | 53.2% | 62.2% | 84.2% | 57.7% |
| Credit Statistics: | | | | | | | | | | | |
| Net Debt / Net Book Cap | 45.0% | 27.30% | 49.5% | 62.2% | 39.4% | 52.6% | 43.7% | 53.8% | 40.6% | 56.0% | 47.2% |
| Net Debt / Net Market Cap | 31.7% | 19.0% | 30.0% | 50.4% | 18.6% | 43.6% | 26.3% | 35.7% | 29.7% | 26.9% | 29.9% |
| LTM EBITDE / Gross Interest | 6.6 x | 10.8 x | 4.8 x | 4.2 x | 11.9 x | 4.6 x | 6.4 x | 3.5 x | 17.2 x | 8.9 x | 6.5 x |

LEHMAN BROTHERS

COMPANY XYZ

FIG. 24

Case Study

FIG. 25

Superior Execution

Lehman Brothers' Energy Leveraged Finance Qualifications

April 17, 2002

$350,000,000

XTO Energy Inc.

7 1/2% Senior Notes due 2012

LEHMAN BROTHERS
*Joint Book-Running Manager*

XTO Energy 7 1/2% Senior Notes Represents the lowest yield ever achieved for Ba2/BB rated 10 year Deal as well as the lowest yield ever achieved for a high yield issuer in the Oil and Gas sector

Situation Overview

- The offering allowed XTO to access the high yield market at all-time record levels using proceeds to acquire additional oil and natural gas assets, repay bank debt and redeem subordinated debt
- The corporate credit rating is Ba1/BB+ while the Senior Notes are rated Ba2/BB
- On April 11, 2002, XTO announced that it had entered into agreements to acquire oil and natural gas properties in East Texas, Louisiana and the San Juan Basin of New Mexico with estimated proved reserves of 145 Bcf of gas equivalent

Company Overview

- XTO is a leading independent E&P company engaged primarily in the exploration and production of natural gas with operations in the western U.S. and Alaska
- At December 31, 2001, the Company estimated its proved reserves to be 2.2 trillion cubic feet of natural gas, 54.0 million barrels of oil and 20.3 million barrels of natural gas liquids (2.7 Tcfe). The average reserve-to-production index for XTO's proved reserves was 14.8 years

Outcome

- $350 million 7 1/2% Senior Notes due 2012 rated Ba2/BB priced at par to yield 7 1/2% (tight end of 7 1/2% - 7 5/8% price talk)
- Transaction priced on a spread basis at 227 bps over the ten year treasury - inside of many investment grade credits
- Proceeds of the offering were used to redeem $115 million of the 9 1/4% Senior Subordinated Notes, fund $121 million in recently announced oil and natural gas property transactions and to repay $90.2 million of bank debt
- Investment grade quality assets and investment grade credit statistics provided strong support from crossover investors, allowing pricing at a record level

LEHMAN BROTHERS

COMPANY XYZ

FIG. 26

Lehman Brothers' Energy Leveraged Finance Qualifications

FIG. 27

4 In Overall High Yield

Significant Momentum in High Yield Year-To-Date

Lehman Brothers' Energy Leveraged Finance Qualifications

2002 High Yield League Table[1]

| ($ in millions) | Amount | Share |
|---|---|---|
| 1 Credit Suisse First Boston | $9,519.5 | 19.3% |
| 2 Deutsche Bank | $7,289.1 | 14.8% |
| 3 Citigroup/SSB | $6,717.8 | 13.6% |
| 4 Lehman Brothers | $4,922.7 | 10.0% |
| 5 JP Morgan | $3,633.5 | 7.4% |
| 6 Banc of America Securities | $3,400.0 | 6.9% |
| 7 Goldman Sachs | $3,026.0 | 6.1% |
| 8 UBS Warburg | $2,865.0 | 5.8% |
| 9 Morgan Stanley | $2,625.0 | 5.3% |
| 10 Merrill Lynch | $1,503.1 | 3.0% |

2nd Quarter 2002 U.S. High Yield League Table

| Underwriter | Proceeds ($mm) | Share |
|---|---|---|
| 1 Credit Suisse First Boston | $3,885.2 | 19.5% |
| 2 Lehman Brothers | $2,340.9 | 11.8% |
| 3 Citigroup/SSB | $2,336.2 | 11.7% |
| 4 JP Morgan | $1,834.4 | 9.2% |
| 5 Banc of America Securities | $1,699.8 | 8.5% |

1st Half 2002 U.S. High Yield League Table

| Underwriter | Proceeds ($mm) | Share |
|---|---|---|
| 1 Credit Suisse First Boston | $7,206.0 | 18.7% |
| 2 Citigroup/SSB | $4,392.3 | 11.4% |
| 3 Banc of America Securities | $3,767.7 | 9.8% |
| 4 Deutsche Bank | $3,534.4 | 9.2% |
| 5 Lehman Brothers | $3,523.1 | 9.2% |

- Significant momentum in High Yield underwriting year-to-date, ranking #2 for the 2nd Quarter of 2002 and #5 for the 1st Half of 2002.
- 156% gain in market share vs the 2nd Quarter of 2001, and 33% gain in market share vs the 1st Half of 2001.
- Significant momentum in High Yield year-to-date, ranking #4 with over $4.9 billion of league table credit and a 10.0% market share.
- Percentage change in market share versus 2001 of 63%, resulting in the best performance by any High Yield underwriter.

(1) Full-Credit to book-runner on the left, or "Quarterback". Lehman Brothers High Yield Capital Markets 11/11/02.

LEHMAN BROTHERS

COMPANY XYZ

FIG. 28

#1 In Energy Leveraged Loans

Lehman Brothers Has Been Active in Energy Leveraged Loans

*Lehman Brothers' Energy Leveraged Finance Qualifications*

- Lehman Brothers is the top underwriter of leveraged loans in the Energy sector and has substantial experience and expertise as lead arranger for E&P, Oilfield Services, Refining and Power companies, arranging 22% of the issues in the sector year-to-date 2002.

YTD 2002 Energy Lead Arranger League Table

| | Bank | Proceeds ($mm) | # of Deals | Share |
|---|---|---|---|---|
| 1 | Lehman Brothers | $4,495 | 5 | 22.4% |
| 2 | JP Morgan Chase | $4,147 | 13 | 20.7% |
| 3 | Citigroup | $2,528 | 6 | 12.6% |
| 4 | BANK ONE Corp | $2,108 | 22 | 10.5% |
| 5 | Bank of America | $1,386 | 11 | 6.9% |
| 6 | Deutsche Bank Alex Brown | $1,304 | 5 | 6.5% |
| 7 | Barclays | $853 | 2 | 4.3% |
| 8 | Scotia Capital | $600 | 1 | 3.0% |
| 9 | Wachovia Corp | $525 | 3 | 2.6% |
| 10 | Toronto Dominion Bank | $470 | 2 | 2.4% |

*Data Source: Lehman Brothers High Yield Capital Markets.*

LEHMAN BROTHERS

COMPANY XYZ

FIG. 29

#1 In Overall Fixed Income Research

Lehman Brothers' Execution Strength Rests Upon the Franchise of our Fixed-Income Credit Research and the Power of the Lehman Brothers Indices

Lehman Brothers' Energy Leveraged Finance Qualifications

2002 Institutional Investor Magazine

*All-America Fixed Income Research Team Awards*

Bar chart — Total Selections:
- LEH: 35
- CSFB: 31
- JPM: 31
- SSB: 25
- ML: 23
- UBSW: 18
- MS: 17
- GS: 13
- BSC: 10
- DB: 10

#1 in Fixed Income Indices

- The "S&P" 500 of the bond market
- Used by 90% of fixed income investors in the US
- 50% market share in Europe
- Managed exclusively by Lehman Brothers
- Provides Lehman Brothers with unique insights into investor behavior

Investors Rely on Lehman Brothers for Strategic Direction, as Well as Specific Credit Research

*Ranked #1 by* Institutional Investor *nine out of the past thirteen years*

1990  1991  1992  1993  1994  1996  2000  2001  2002

LEHMAN BROTHERS

COMPANY XYZ

FIG. 30

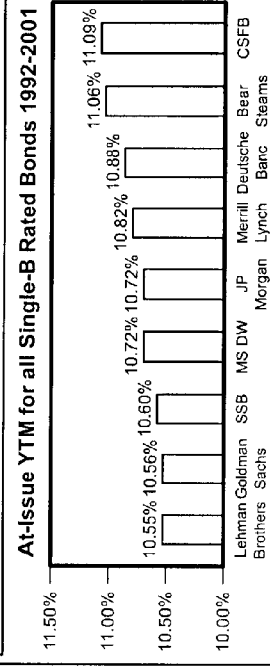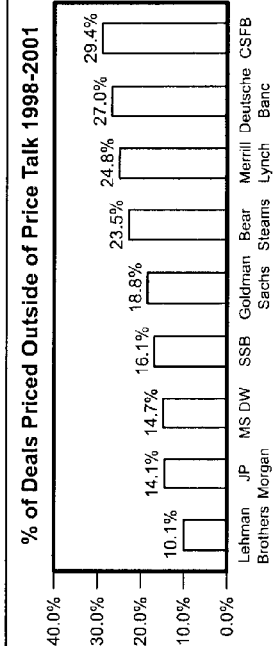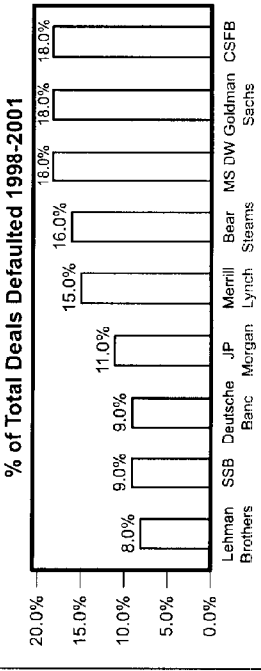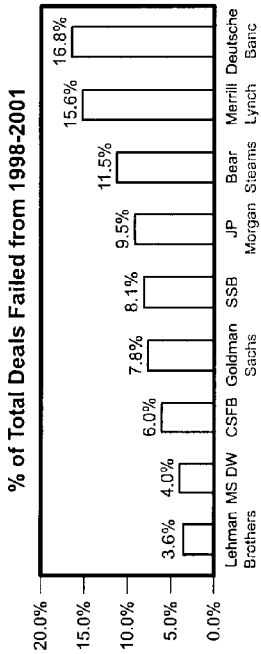
FIG. 31

DYNAMIC PRESENTATION GENERATOR

CROSS REFERENCE TO RELATED APPLICATIONS

This application is a continuation of U.S. patent application Ser. No. 10/812,212, filed Mar. 29, 2004 now U.S. Pat. No. 7,428,704. The entire contents of that application are incorporated herein by reference.

FIELD OF THE INVENTION

The present invention is generally directed to a data processing, program controlled system for developing enhanced presentations for speaking engagements and the like. More particularly, the present invention provides a collection of tools and controls that substantially streamline the process of creating, editing and finalizing professional quality, computer generated presentations.

BACKGROUND OF THE INVENTION

Modern corporate life is now periodically punctuated with meetings having as a centerpiece a computer generated presentation utilizing presentation graphics programs, such as PowerPoint® by Microsoft®, Presentations® by Corel®, and others. The subject of the presentations is unlimited, spanning almost every aspect of professional business activity, from simple sales pitches to sophisticated analysis of potential take-over candidates. The common theme to these presentations is the need for eye-catching graphics and text, dispersed with the core—but sometimes less appealing—data.

The modern retail presentation software package has evolved to a highly functional, incredibly powerful and versatile presentation slide creator, with hundreds of possible variations for presentation styles. Indeed, the level of operating sophistication of the packages renders them almost unusable without dozens if not hundreds of hours of practice or training. While these retail products often include a separate package of style templates to ease and simplify operation, navigation through these templates themselves is an incredibly tricky process.

For larger entities, such as corporations, and other institutions, there is a hidden risk associated with widespread use of these presentation packages. It is important to note that these presentations are for transferring information, some of it sensitive, and the rest typically impacting the overall impression of the institution in the eye of the presentation audiences. Clearly, corporations and others are concerned with content and wish to present a common, structured impression whenever representatives are active in presentations on behalf of the institution. This issue is particularly acute for presentation packages, known as "pitch books" used to promote a corporate service offering. These pitch books are often provided with details and may last significantly past the initial presentation. Thus, it is critical that the appearance remain and provide a powerful and positive theme.

And finally, the actual content that is imported to the presentation is itself found in a myriad of legacy data types—spreadsheets, databases, information from data vendors, etc. This data is not uniformly stored and often, very dynamic, such as security price data and corporate valuations.

For large corporations, the above issues are typically addressed by devoting a. dedicated staff of well trained presentation creators, available to the sales and management teams, to assist in custom building of individual presentations for select occasions. These individuals are highly skilled in the graphics capabilities of the retail presentation software and, more importantly, can impart a common "look and feel" to each disparate presentation that is a positive reflection on the corporation.

Of course, there are problems with this arrangement, beyond the mere expense of a dedicated staff. For one, these individuals often lack the intimate details of the presentation and its underlying purpose. Moreover, the creation timeline is often extended as the presentation becomes an iterative process, interrupting and/or delayed by intervening events. This often prevents use of these talented creators for the smaller, less critical presentations, which are thereafter left to the individual presenters to fight through the layers of programming to complete their slides. This is an important problem as these smaller presentations far outnumber the big ones, and, in sum, may impact external perceptions in a greater way.

It was the recognition of the above problems by the inventors that has led to the development of the presentation enhancement system disclosed and described in detail infra.

OBJECTS AND SUMMARY OF THE PRESENT INVENTION

It is an object of the present invention to provide a system for preparing individual presentations in conjunction with a retail presentation software package that is simple, easy to operate yet produces a sophisticated presentation having a common look and feel sanctioned by the supporting institution.

It is yet another object of the present invention to provide a computer system and software package that includes selectively tailored templates that simplify the presentation creation process in a custom manner.

It is a further object of the present invention to provide a template for use in a graphics software package that includes embedded code to facilitate the generation of custom slides.

It is still another object of the present invention to provide a software platform that is network based and designed to facilitate the integration of presentation data with select presentations wherein the data is taken from a remote application and server.

It is still another object of the present invention to seamlessly link data from programs, e.g., spreadsheet, to fill a properly formatted slide with salient data within a custom structured presentation.

It is a further object of present invention to provide a software based solution to effect consistent and powerful brand identification in association with presentation slides, wherein the branding components are added in a seamless and efficient process.

It is yet another object of the present invention to provide environmental tools for use in conjunction with a retail presentation graphics program to streamline the preparation of sophisticated, professional quality presentations having a common theme/brand therein with the construction completed without significant training or experience.

It is a further object of the present invention to provide a software agent known as the "Assistant" to automatically check and assure that formatting is consistent across plural slides within a presentation.

It is yet another object of the present invention to provide a software agent to automatically create select slides for insertion into the presentation.

It is also an object of the present invention to provide a software agent in the slide creation process, known as the Assistant that tracks shapes and associated properties thereof to assist in the presentation building process.

It is still another object of the present invention to provide a data processing method that permits a lightly trained user to develop complex presentations that include selectively embedded databases in a multiple slide format that further comprises integration of custom slides with slides from a template database each conveying a common branding theme.

It is yet another object of the present invention to include programming in a data processing platform that restricts and/or inhibits selected functionality of the retail presentation program.

The above and other objects of the present invention are realized in a novel data processing platform and processing method configured to enhance and formalize sophisticated presentation graphics. In a first illustrative embodiment, a programming tool set is provided for use in conjunction with a retail presentation graphics package. A representative package and the preferred platform for the present invention is the PowerPoint®t product distributed by Microsoft®Inc. The tools and supplemental programming associated with the present invention include formatting software for structuring the presentation slide, including ancillary graphics and branding characteristics, a template and logo library, global presentation context template and related tools for maintaining presentation integrity. In addition, selectively configured USER assistance programs (software agents) are provided to enhance user access and implementation of the presentation development tools.

In accordance with the varying aspects of the present invention, the software tool set and associated platform and data files are further supplemented by a separate tool known as PresLink. In particular, PresLink includes as part of its feature set, the capability to seamlessly connect remote data sources, such as spreadsheets, to a newly developed presentation for use in one or more slides thereof. In particular, PresLink configures the remote data and establishes the network links to facilitate the data transfer—either static or dynamic—to become part of and to conform in appearance to the presentation under development. Specifically, PresLink ensures that the data tables, once transferred, are inserted with the proper level of formatting information to maintain the common branding appearance and style consistent with governing corporate policy.

BRIEF DESCRIPTION OF THE FIGURES

For a more complete understanding of the specific embodiments, FIGS. 1-31 are provided as illustrations relating to the practice of the present invention, wherein:

FIG. 1 is a functional block diagram of the network operating environment preferred for the present invention;

FIG. 3 depicts the PresBuilder Toolbar; and

FIGS. 4-31 provide an illustrative presentation created with the present invention.

DETAILED DESCRIPTION OF THE INVENTION

Figure 1:
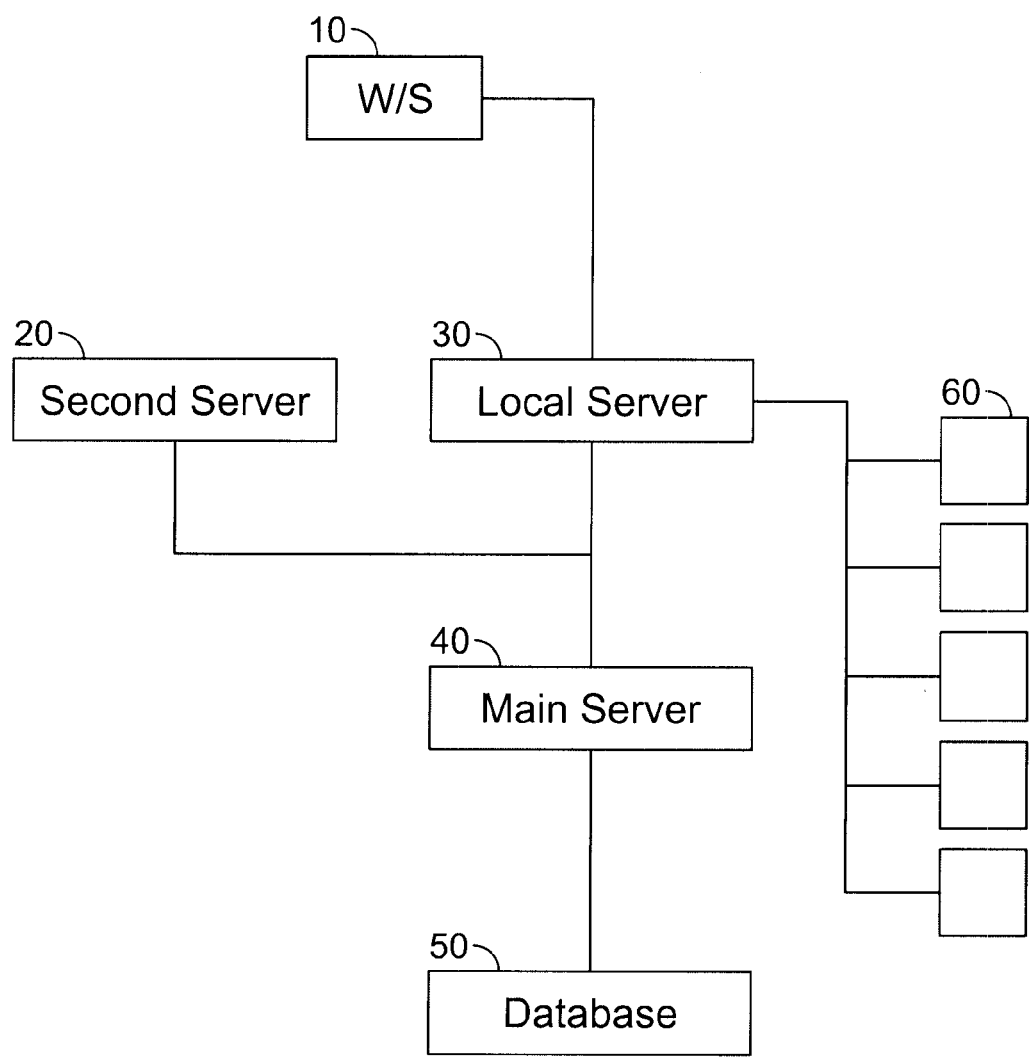

First in general overview, the product and system of the present invention is generally known as PresBuilder, with this term generally encompassing the features and capabilities provided by the inventive software tool set and associated with building sophisticated presentations. As with the underlying PowerPoint(t product, PresBuilder envisions on a basic level, the use of multiple slides supporting either a projection based presentation ("projection scheme") or a handout presentation ("print scheme"). There is a large body of existing commercial literature discussing PowerPoint®) and its operation. While not a substantive limitation to this disclosure, we hereby incorporate by reference the Office/PowerPoint® user guide, as a reference work for understanding the current advancements.

PresBuilder simplifies the creation of both by applying pre-package color schemes to the same foundation slide set. This foundation slide set is the presentation template and includes the following individual slides:

1. Title slide
2. Table of Content slide
3. Tab slide
4. Standard Content slide

Slide organization is directed at generated common themes and universal branding. The Standard Content Slide is the universal template for each succeeding slide in the presentation, i.e., the starting point for building individual slides on diverging subject areas. The Standard Content Slide in a preferred mode, is a PowerPoint® template that is further enhanced with embedded information that works in conjunction with system software. For example and by way of illustration only, managed shapes are used in the Slide Header, Section Header, Sub Header, and Slide Number as applied to the standard content slide. In contrast, shapes used to populate the "content" section of the slide are non-managed. The various features forming slide topology are discussed in further detail, infra. Collectively, the style elements found in the preparation of each slide are user selected; however, a stored "Style Guide" is provided that includes guidelines for select aesthetic considerations, such as location of color, font, etc. This style guide will provide information, tutorials and guidance that conforms specifically to the needs of the industry or market addressed by the presentation.

In the following description, the term "shape" is used to generically include objects found in a presentation graphics package (PowerPoint) slides, such as the slide header, a chart (static or dynamic), a table or similar. In this context, the system stores a configuration file that includes a property set (width, font, size, etc.) for each shape in a slide. This property set can be established and stored by the process of "tagging." Tagged sets are created, stored and used by a software agent, known as the Assistant to assist in the slide review process. Compliant shapes have a property set that match the tagged properties for that shape. Managed shapes comprise tagged property sets that cannot be altered without special keys. Because these special keys, or "administration" level rights, preclude most users from adjusting the parameters of managed shapes, continuity in these slides is assured. In this way, a corporation can maintain branding uniformity by maintaining select shape properties as "managed," thus involatile as a part of company policy.

As mentioned above, the system operates in conjunction with select software agents to assist in the developing presentation. A core software agent is known as the "Assistant." The Assistant provides the main functionality associated with the presentation building process and further ensures consistency within the presentation by identifying and fixing non-compliant shapes. Specifically, the Assistant allows the user to:

1. modify the properties of the slide,
2. "Tag" shape properties, and
3. locate and fix non-compliant shapes.

An important function of the Assistant involves Tagging of slide properties. Tagging is a save/storage process that collects the "current" or "default" properties of a shape and stores these in the Assistant Tagged file. For example, Assistant Tagged properties can fall within the following illustrative categories for a slide:

1. Slide Type—Identifies the type of slide selected from "title," "table of contents," "Tab," or "standard content."
2. Shape—Identifies whether it is managed or not managed.
3. Shape Properties—Font, color, lines, position, size, etc.

Tagged shapes have enhanced flexibility in use. Changes can be made to the shape properties; however, these changes can be quickly reverted back to the initial tagged values seamlessly. In this context, a non-compliant shape refers to a shape that has a current property set that differs from the stored tagged set for that shape. This can arise in several ways. For example, reformatting a tagged shape, without updating, creates a non-compliant shape as a discrepancy develops between the current and tagged property set.

Importantly, the Assistant operates both to identify non-compliant shapes and to correct these, either globally or through individual adjustments of shape properties. Invocation of the Assistant triggers a display box that highlights properties of an individual shape that are in non-compliance (typically, these properties are depicted in red; compliant properties in blue). Prompts provide for converting the non-compliant values to compliant values consistent with the current Tags. In this way, Users can easily review changes that have been made by other Users and either accept the changes or easily revert them back to the original settings.

A separate feature of the present invention resides in its ability to import charts and tables into a presentation using a linking program. Application of this feature requires the use of pre-formatted slides, known as Model slides. The slide builder enables the easy insertion of branded charts and tables into generally accepted positions within a slide. For example, rather than just inserting a slide, Users can easily build slides and insert shapes into consistent locations on one or more slides thereby maintaining a standard format across the presentation. These slides include formatting codes and property sets that conform to the purposes of the selected model. Model slides may be created and stored in a library available for selection and insertion into a presentation. Exemplary slides include Text and Tables, Team Page, Charts (standard and special), Diagrams, Qualifications, and Grid Layouts.

Importantly, the system mandates that Model slides are used to receive charts to ensure that color/size are properly formatted. A wide range of charting styles, e.g., bar, pie, column, etc., may be pre-formatted into the library of Model slides thus substantially simplifying the chart/slide creation process. In addition, a software tool known as SlideBuilder streamlines the slide assembly process while preserving the branding attributes in the presentation. This tool operates in accord with typical "wizard" based conventions, but with a greatly expanded repertoire of functions specific to the industry/business of the User. Specifically, SlideBuilder accesses multiple formats and templates custom for that client and allows for higher quality slide structures. Once selected, custom layouts are constructed for easy insertion of bulleted lists, charts, and tables. Using automated aspect ratio control for charts reduces improper or distorting chart stretching when imported into the Slide. This functionality is also applied to Tables. SlideBuilder further permits re-use of pre-existing slides into an updated presentation.

Client logos are often an important cosmetic in any presentation, and mandate precise use. The system includes a client logo library, specific to that industry and functionality to ensure that the logo is properly positioned with the presentation (a "footer," "cover" or "content" selection is provided).

Two modes exist for populating the chart with data. The preferred method is using the software tool discussed earlier known as PresLink. This automates the transfer from a selected existing Excel® table. Alternately, the data can be manually entered. For graphs, and specifically graphs involving high quality price/earnings data, a separate software application known as ActiveGraph® is used. This commercially available software tool combines the powerful analytical engine and access to large data stores and the facility to link corporate legacy programs with the presentation graphics slide. Menu driven prompts delineate the particulars of the graphed data for use in the slide, e.g., time period, interval, CUSIP, tickers, etc. Advanced processing analytics prepare the data for select organization on the graph as applied to the appropriate model slide.

Tables are inserted into Model slides in a similar fashion. Tables are imported in a picture based format. The principal importation mechanism is a tool called PresLink, a custom spreadsheet linking tool for Excel® (or other) spreadsheet-based data. Tables may also be taken from a word processor. The word processor is preferably Word® by Microsoft® because the formatting conventions are consistent with PowerPoint® presentation graphics, making movement into a Model slide essentially seamless.

Spreadsheet linking allows users to seamlessly create data-based charts and tables conforming to the formats associated with the presentation graphics software or typical word processing software, e.g., Word®. The PresLink software tool accomplishes this functionality and comprises code to establish a custom Toolbar, File Manager, Help Wizard, and Linking Menu to guide user operations. This tool is illustratively demonstrated here using Excel® based spreadsheets, and creates dynamic links so that changes in the data stored within the spreadsheet will be transferred to the presentation. In a preferred arrangement, a single-click menu icon allows for instant "refresh" of the imported graph or chart from the originating application (e.g., Excel®).

Consistent with the common branching objective of the present invention, the spreadsheet linking tool applies stored table formats to spreadsheet output in the Table building process. To achieve this, a presentation build menu is configured into the menu bar for Excel® which includes functions to apply a select Table format, update the Colors Palette, Reapply Last Style, (undo style) and Toggle Gridlines. The Table Format menu triggers multiple entries, including style choices for Headings, Rows, Subtotal, Total, Highlights, and box attributes (thin or thick). Once the proper formats are applied to the selected data ranges in the spreadsheet, the "Table" is available for export to the presentation graphics software and placement into a slide as a Shape. This is accomplished by the linking tool and triggered by a menu entry off the spreadsheet toolbar, e.g., "Export Range to PowerPoint" or alternatively, to Word "Export Range to Word." The Tool takes the selected and formatted data range and transfers this using the file manager to the PowerPoint shape directory for use in PowerPoint, but stored as a picture file for use.

In addition to the above-noted capabilities, the present invention fully utilizes the extensive tools, guides and wizards already a part of the retail presentation graphics' product. These extant tools are incredibly rich and powerful and become an important asset in the overall capabilities of the enhanced system of the present invention. Specifically, these enhancements apply state of the art nomenclatures and "assist" techniques to the specific programming features of the present invention.

Turning now to FIG. 1, a block diagram depicts the hardware components of the present invention in hardware terms. The general hardware platform is a PC-based network, linking multiple PC workstations (10) with plural servers for controlling communication, storing content and processing data. Specifically, an illustration of a corporate network infrastructure, PC (10) is connected to a local server (30) and second servers (20), via Novell and/or Microsoft network protocols. Also linked to the network are Main Server (mainframe—legacy programs) (40) one or more databases (50) and other workstations (60) configured to operate in this environment. It is preferable that the network is further equipped with a document management software package to properly control access to database libraries, etc. Not shown but implied are links to trading exchanges, external offices, data vendors (e.g., Bloombergs®, Reuters®) and the Internet.

Within this structure, workstations are equipped with retail-based presentation graphics' software and the inventive tool set for enhanced operation of this software. One or more legacy application(s) reside on the mainframe (40) available for access and use in the graphs/charts/tables during the presentation build cycle.

Figure 2A:
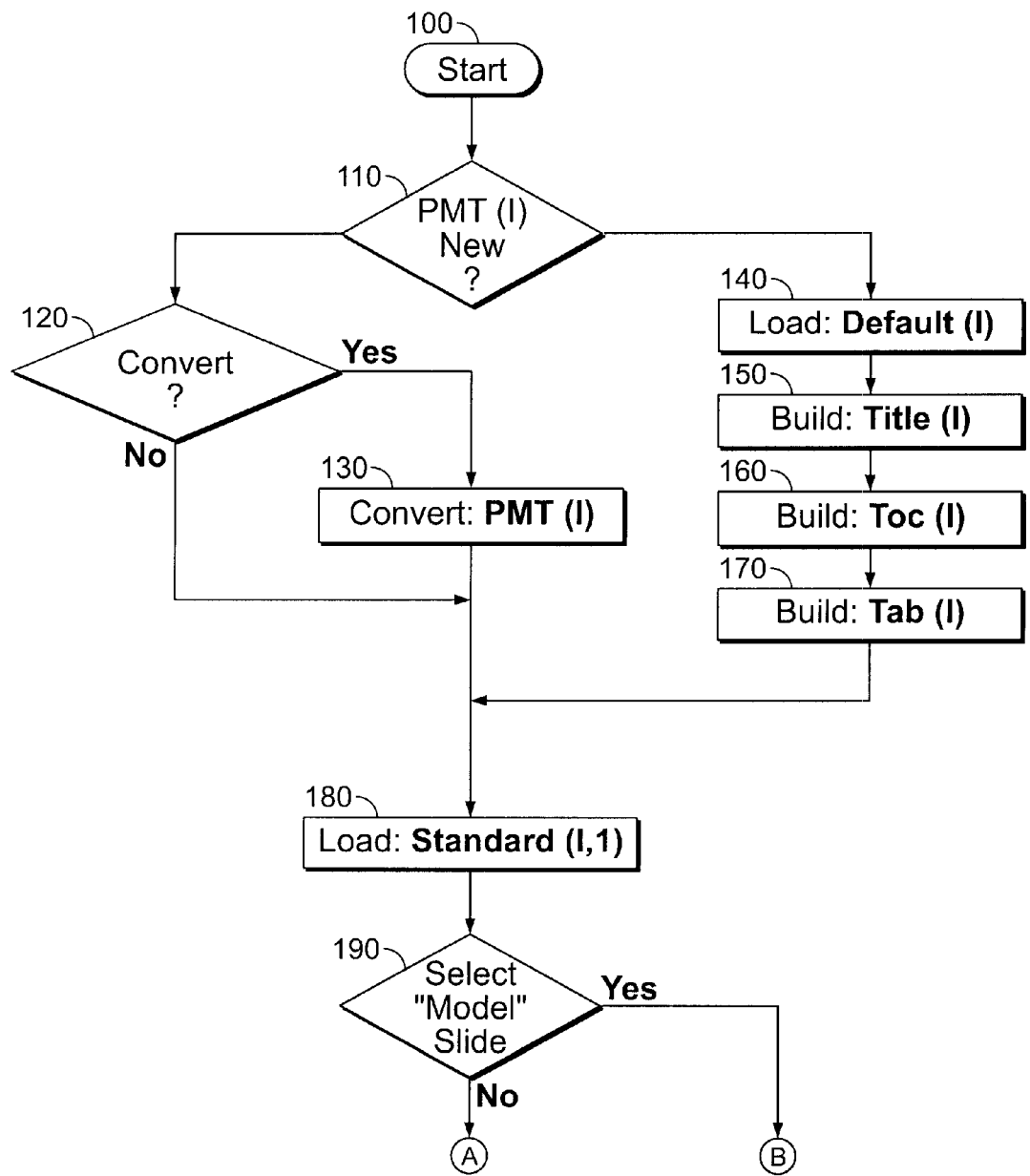
FIGS. 2A-C are logic flow charts depicting the present invention.
Figure 2B:
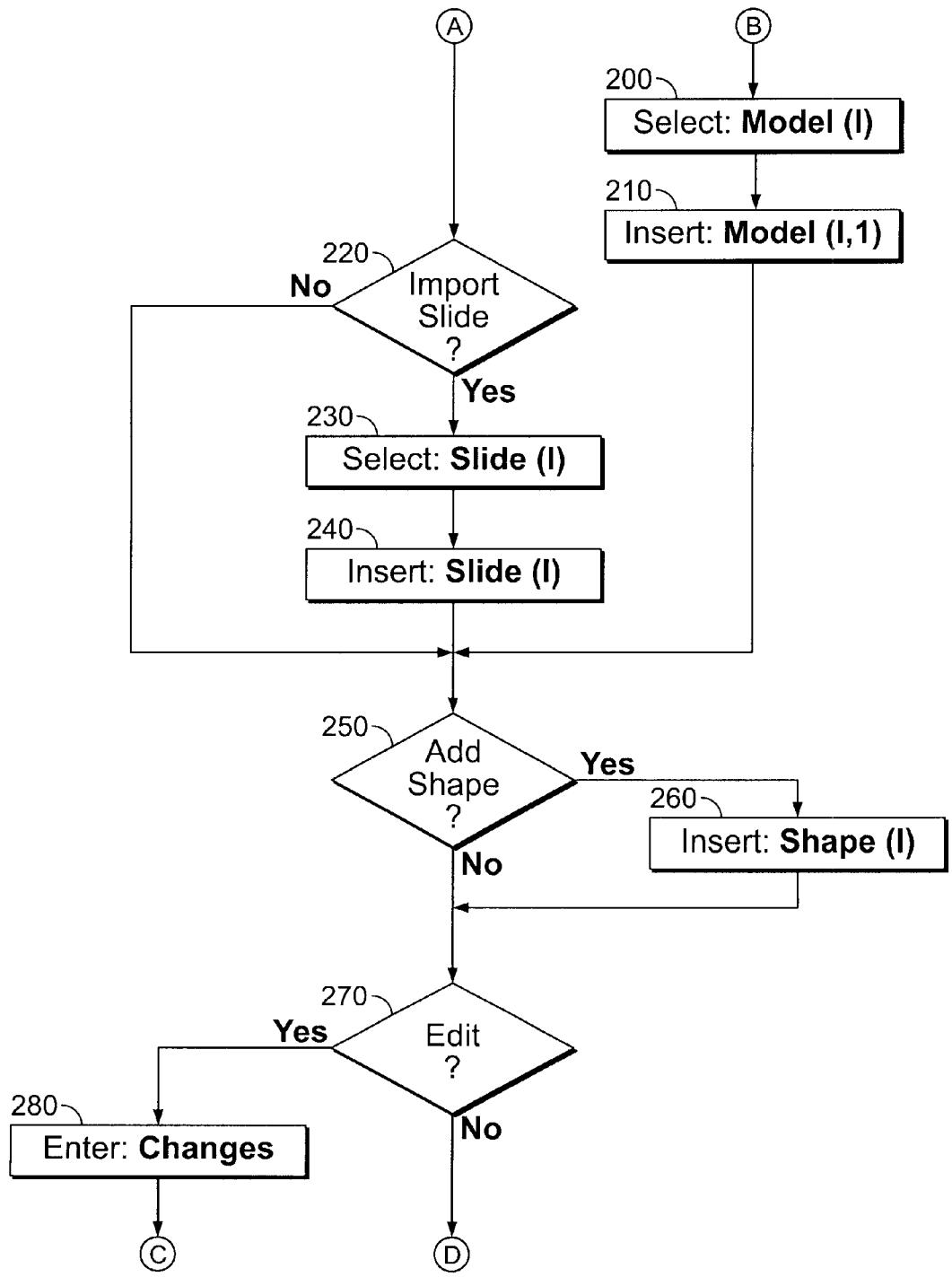
Figure 2C:
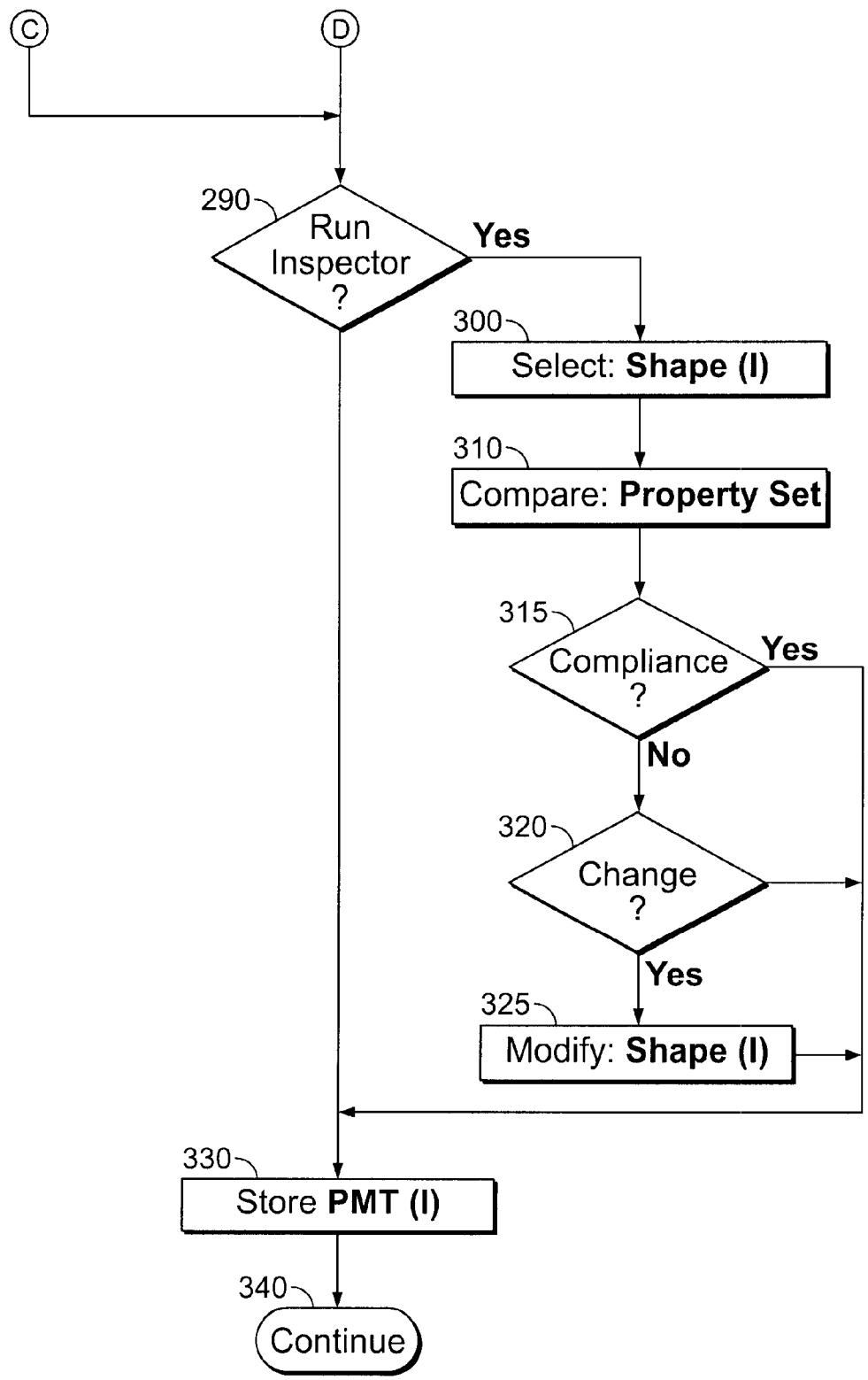

Turning now to FIGS. 2A-2C, an illustrative flow chart is presented depicting the processing logic associated with the present invention. Typically, the Presentation Build process is accomplished on a suitably programmed and configured workstation within a network environment, as discussed above. Logic begins with system Start block 100 and the selection of a presentation, PMT(I); at test 110, the system queries if the selected presentation is new or previously developed. If new ("Yes" to test 110), logic branches to block 140 and the system loads default parameters to initially populate the presentation with stored configuration data, default (I). Thereafter, the system automatically constructs the Title slide, block 150, the Table of Contents slide; block 160, and an initial Tab slide, block 170. If, however, PMT(I) is an existing presentation, the system checks to see if the presentation already conforms to the system embedded configuration. If conversion is needed ("Yes" to test 120), the presentation configuration data is converted to a conforming set, block 130.

Logic thereafter continues to block 180 and the loading of the Standard Content slide, Standard (I, 1) for the initial, post-Table of Contents slide entry. As loaded, this slide is a blank slate, ready for custom design. This process begins by selecting a "Model" slide from the template library ("Yes" to test 190) for use, depending on the nature of content to be added.

As previously noted, the Model slides reside in a library and provide selectively constructed templates that are designed for industry specific content. For example, in the financial industry, brokerage houses are often involved in promoting highly focused, but complex investment services to large institutional clients. This is facilitated by use of "pitch books," i.e., slide presentations that capture the features and benefits of the services offered to that client. Accordingly, for the brokerage house, the library of Model slides will be largely dedicated to template having characteristics of that style pitch book content, including such items as a roster of team members, and graphs and tables reflecting past deals and return performance, etc.

It is likely that other industries will have a different set of presentation needs, and thus, it is important that the Model slide library be populated by slide styles that conform to the presentation needs for that industry, e.g., aerospace, semiconductor, manufacturing, charitable fund raising, lobbying consultants, news organizations, and the like.

Continuing with FIG. 2B, a Model slide is selected from the library, block 200, and inserted into the presentation, block 210. Alternatively, a non-model slide may be selected and inserted, via test 220 and blocks 230-240.

Once inserted, the Model slide may be crafted to its intended purposes with the addition of one or more shapes. As discussed earlier, both Standard and Model slides begin with preformatted shapes corresponding to headers/footers, etc. This ensures proper and consistent branding throughout the presentation. In addition, tables, charts and text may be added and additional software tools, such as ActiveGraph(® (commercially available) and PresLink exist to facilitate this process. This process is generically depicted in FIG. 2B, starting at 250 with the "Add Shape" test. A positive response branches logic to block 260 and the selected shape is inserted. Test 270 offers the user the option to modify Shape (I), with edits entered at block 280.

Turning now to FIG. 2C, the system Assistant may be invoked at test 290. At block 300, the Shape is selected and the Assistant compares the associated property set, block 310. If in compliance ("Yes" to test 320), logic continues to store command, block 330. However, if the shape is not in compliance, the user can bring it into compliance, test 325 and block 325. This process is repeated for each shape selected in the presentation.

Figure 3:
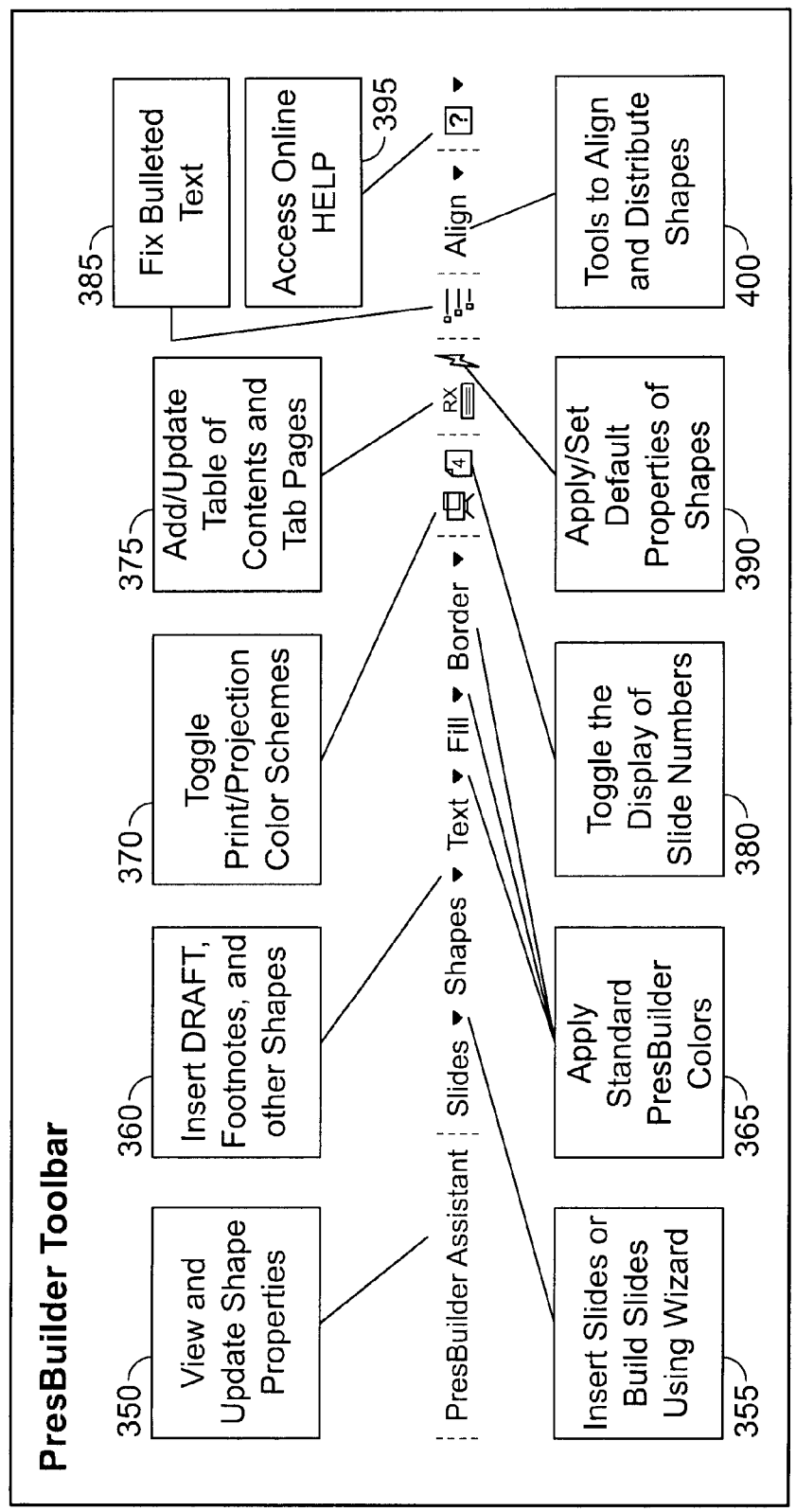
Figure 9:
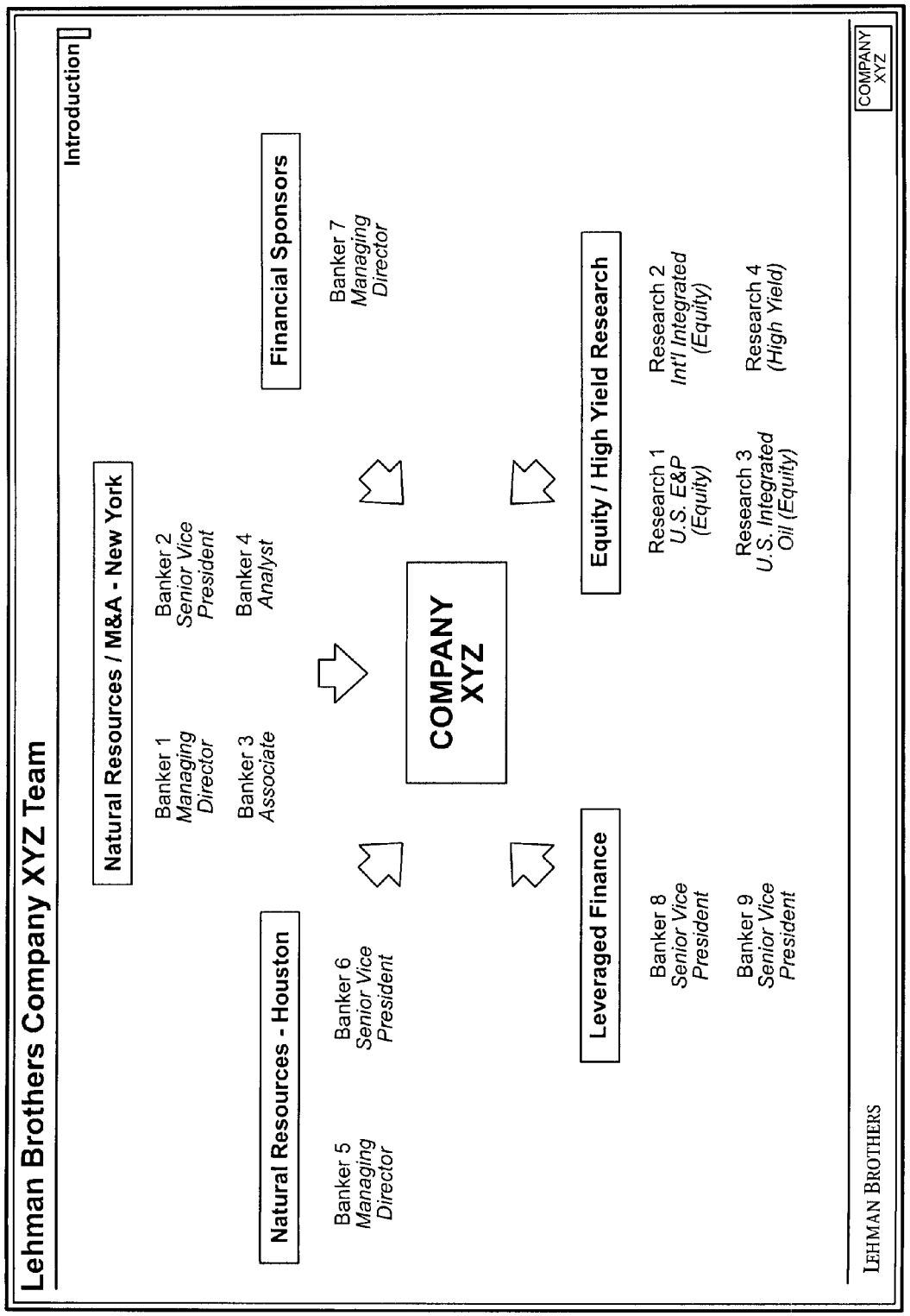
Figure 10:
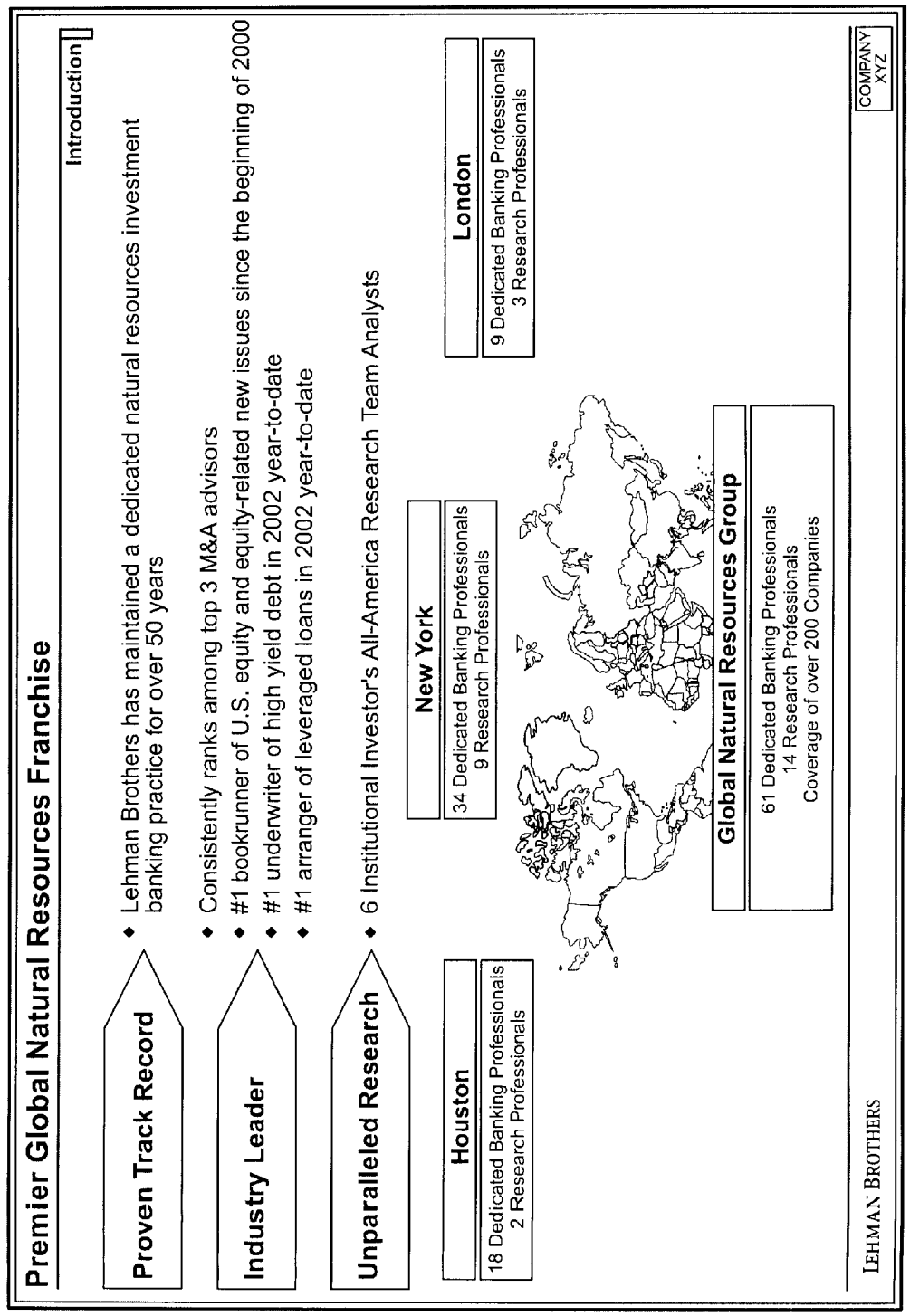
Figure 13:
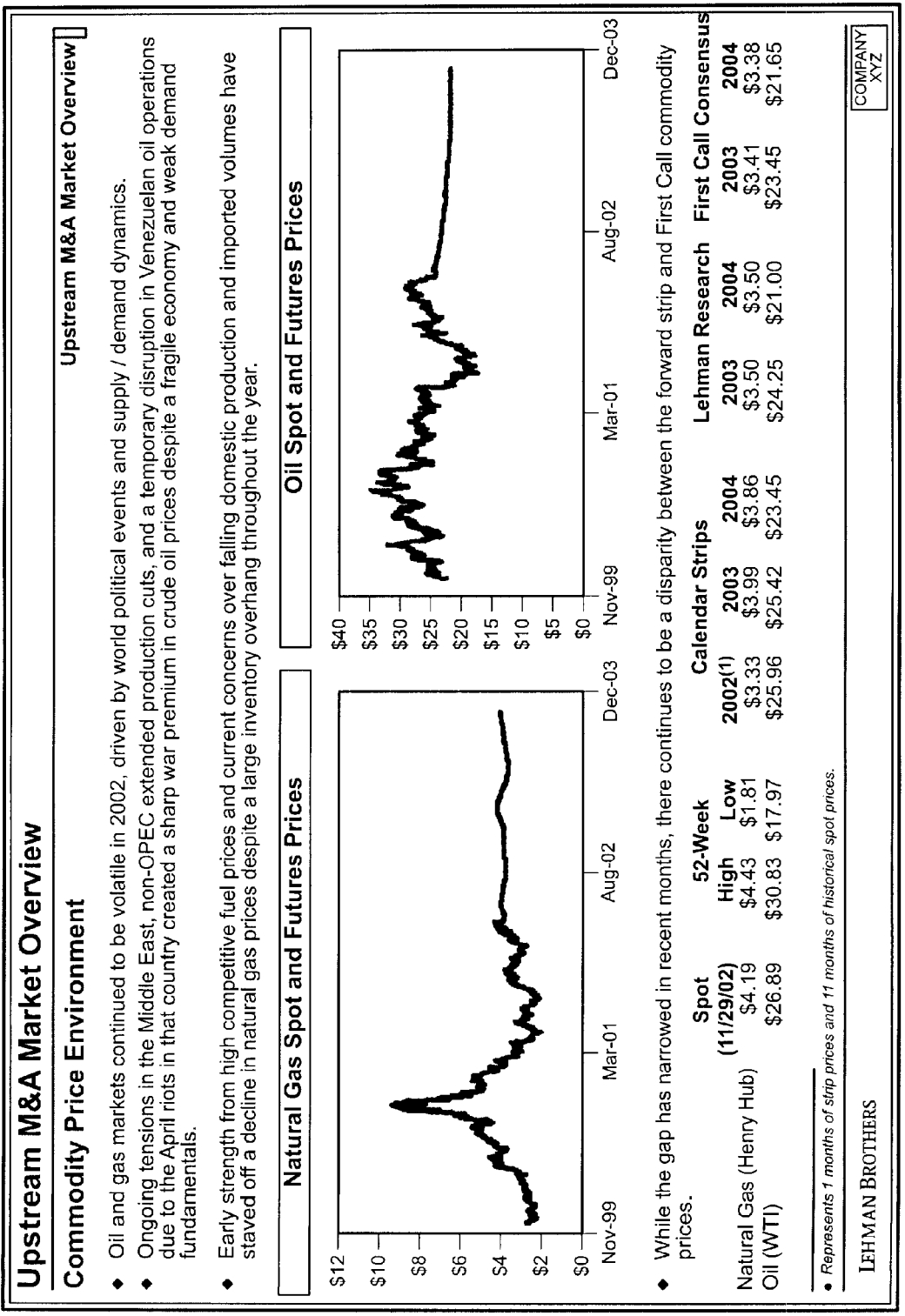
Figure 15:
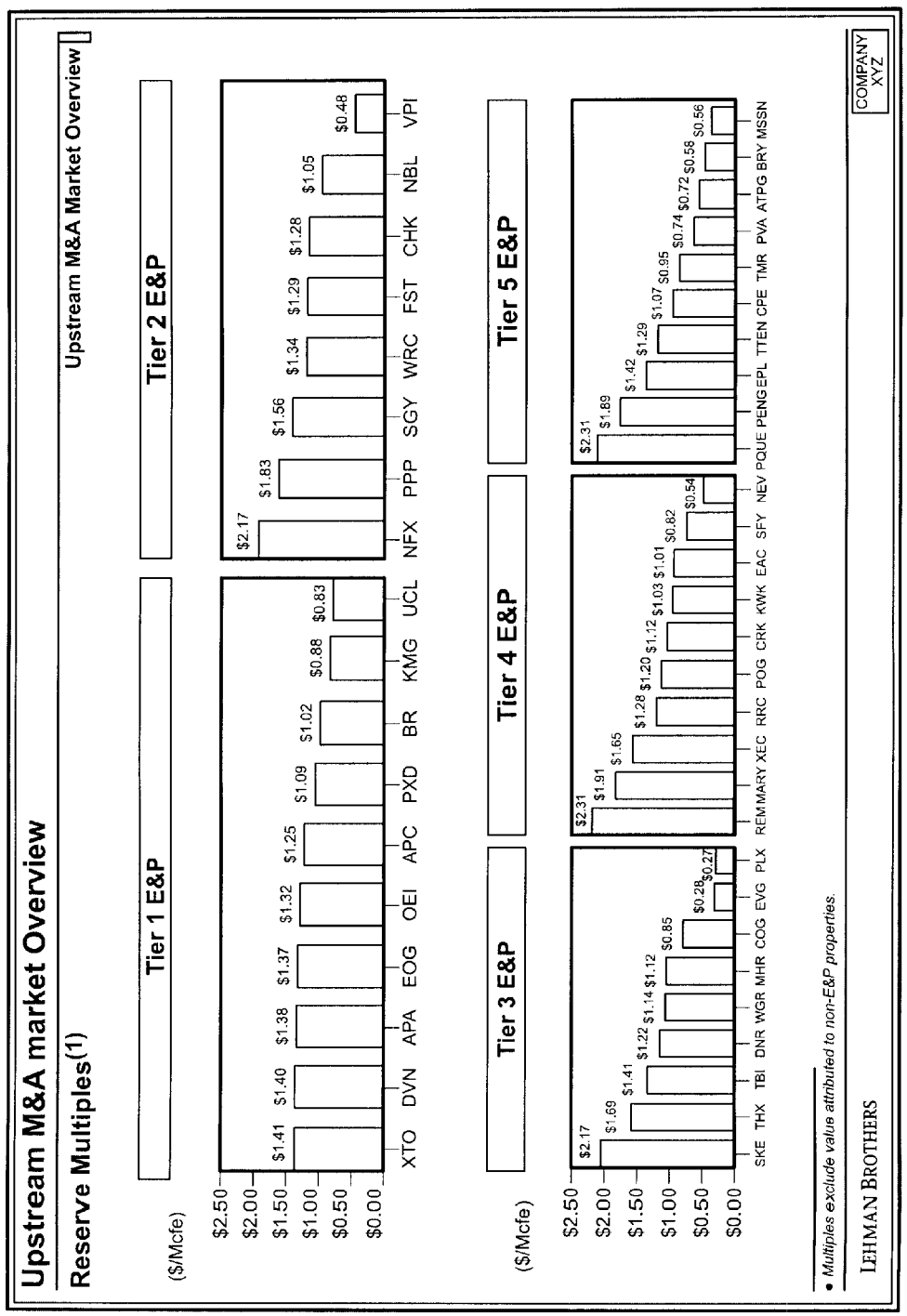
Figure 17:
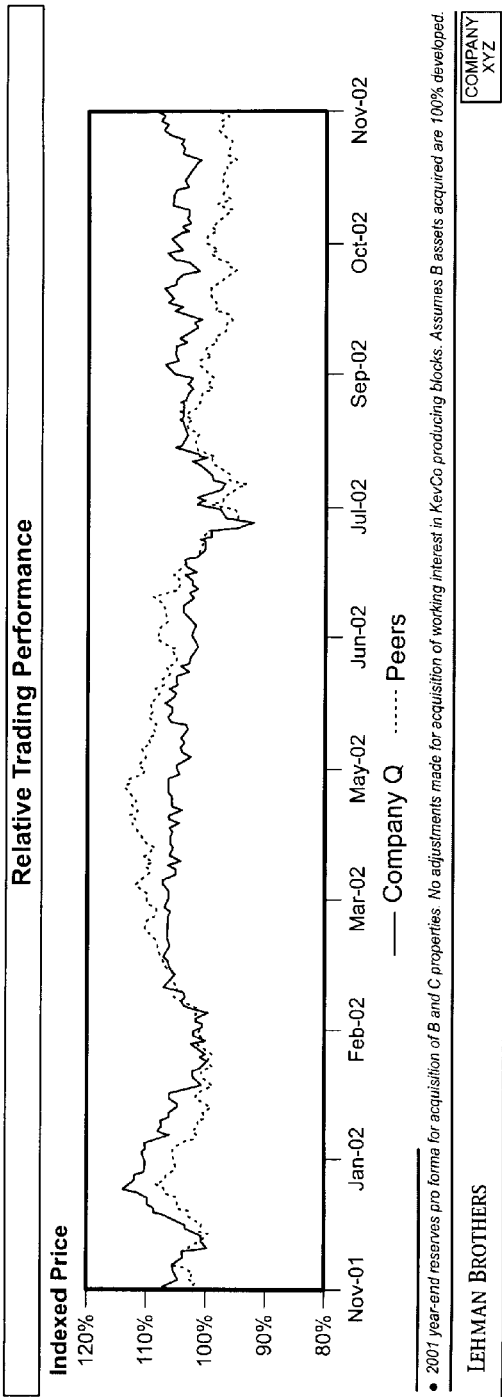
Figure 18:
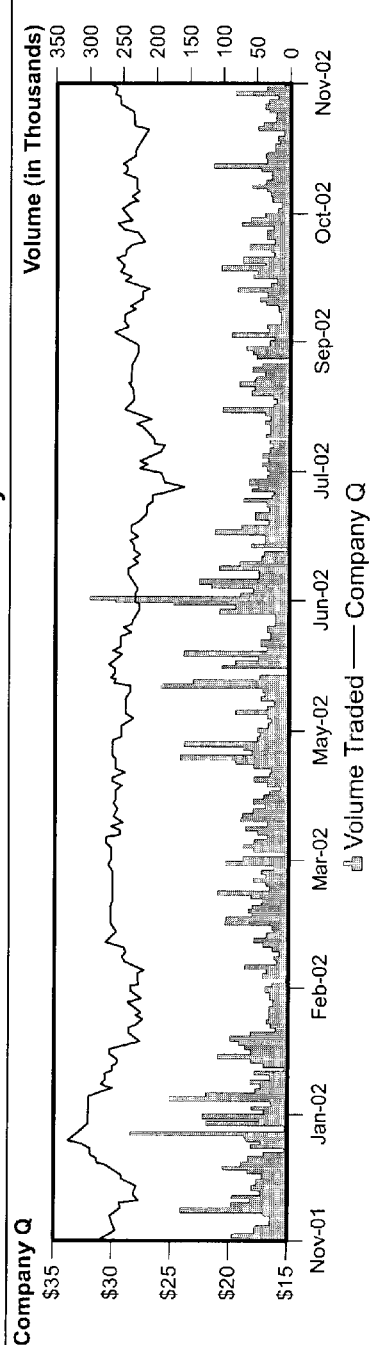
Figure 19:
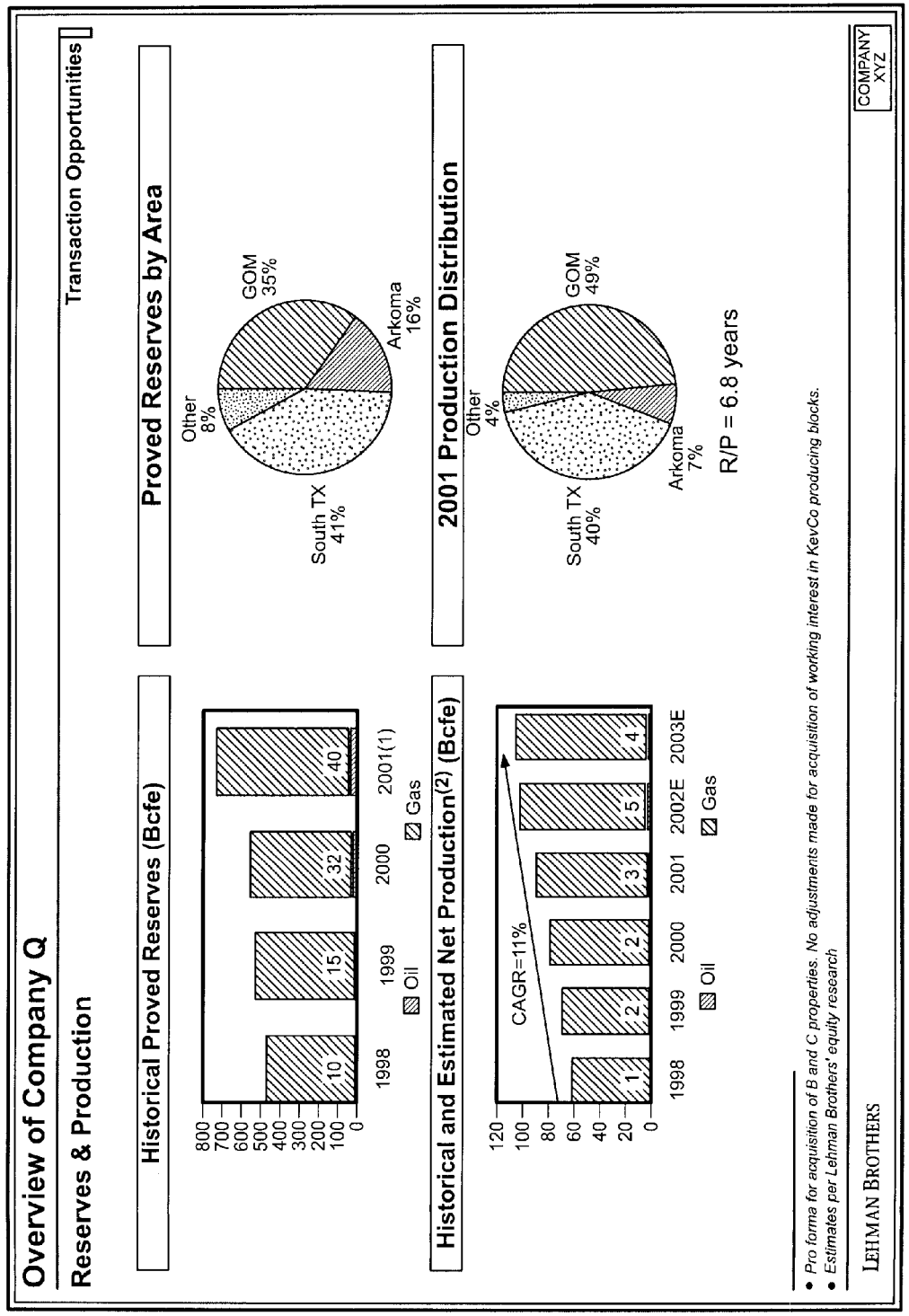

The PresBuilder Toolbar is depicted in FIG. 3 and otherwise appears across the top of the display during a presentation build session. The array provides eleven selectable buttons for invoking various elements of the PresBuilder operation. Tab 350 invokes the PresBuilder Assistant, discussed previously to facilitate shape control within the Slides. Tab 355 includes drop down menu selections to build or insert Slides directly. Tab 360 provides a drop down menu to a custom selection of shapes for insertion. Icons 365 present a selection of standard colors, etc. acceptable for use in the Slide. Icon 370 toggles the current slide between color/style attributes for print (pitchbook) and projection. Similarly, Icon 380 toggles the display of Slide numbers. Icon 375 adjusts or creates Table of Content and Tab pages. Icon 390 resets the shape properties to the default settings. Tab 385 corrects bulleted text. Tab 400 drops a menu of commands to control alignment and distribution of shapes within the Slide. And finally, Tab 395 accesses system Help functions. In this Figure, block descriptors are provided above and below the toolbar indicating the functionality for each button and/or icon. These descriptors are not onscreen, but are otherwise available in content through the help system.

EXAMPLE

The foregoing principles are further elaborated in the following example. In this example, a sample presentation is constructed for a financial firm, comprising 28 slides. These display screens associated in this build process are found at FIGS. 4 to 31.

This example provides a presentation involving sophisticated graphics, tables, charts, and a common branching theme suggesting creation by a professional graphics company or department. This illustration, while made by the inventors' staff and not investment bankers, per se, was constructed using the foregoing software and system operations. In this example, a pitch book is prepared for a potential client XYZ, by the investment bankers, Lehman Brothers.

The creation process follows the protocols described above. A template is pulled from the library, comprising some common graphic elements typical for this kind of presentation. In addition, system parameters trigger the creation of Title slide, Table of Contents, and initial Tab slide. Thereafter, individual slides are sequentially created with the Model slide ensuring a common theme in each; see, e.g., Caption placement and Title bar thickness in pages 6-12.

Operation proceeds with each slide in sequence, and typically involves invocation of the slide builder tool as discussed previously. Format selection is dictated by Slide content in terms of shapes, logos, tables, charts, etc. Slides include pre-formatted templates (e.g., "team") or "logo" slides). Tables and charts are created in their native programs, such as Excel® and automatically formatted to comply with branching colors, etc., so as to match the formatting elements of the template selected through the linking process.

As demonstrated by this example, a detailed sophisticated presentation can be developed that further includes a common branching theme and appointments rendering a cohesive presentation. The inventive platform provides the tools and programming that permits persons without significant background in graphics presentation work to achieve clear, crisp presentations that have a professional quality to their overall appearance.

Figure 32:
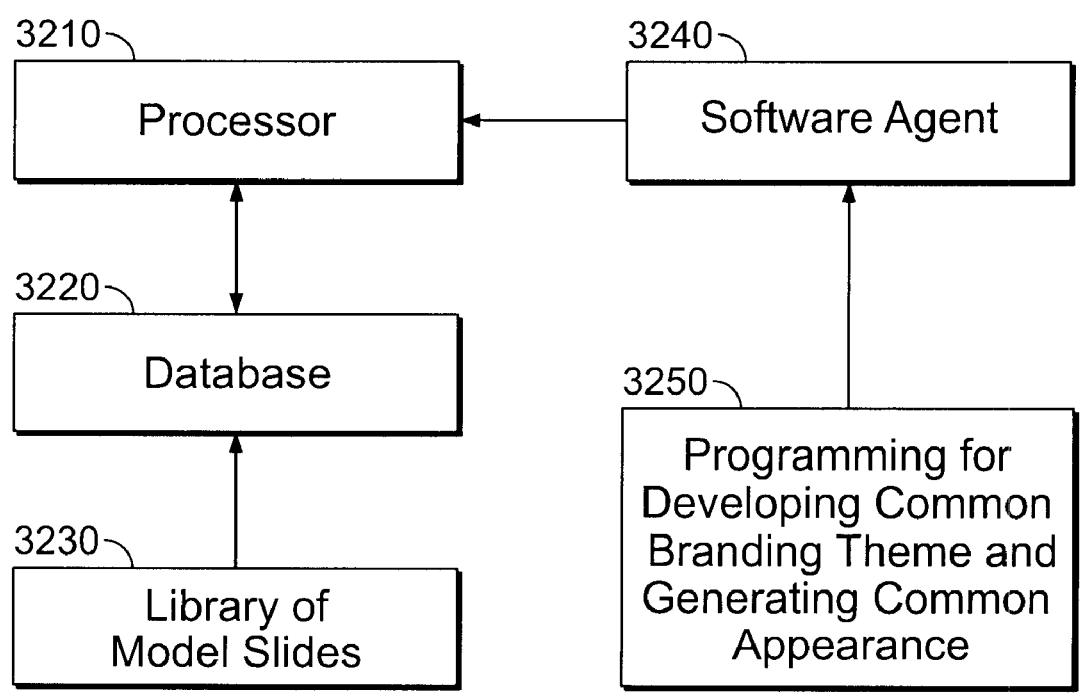
FIG. 32 depicts an illustrative embodiment of the invention.

FIG. 32 depicts aspects of an illustrative embodiment of the present invention. Processor 3210 implements a stored program directed to presentation graphics. Processor 3210 preferably is programmed to implement one or more software agents 3240 for enhancing and automating a presentation design sequence. Agent(s) 3240 include(s) programming 3250 for developing a common branding theme through multiple slides and seamlessly generating a common appearance through the multiple slides, which collectively comprise a unified presentation. Database 3220 preferably stores a library of Model slides 3230 having specific attributes to corporate-based identifying and/or industry related themes.

The above description is merely illustrative of select embodiments of the present invention and does not, in any way, act to restrict the variations available to accomplish the inventive features therein. The foregoing inventions are solely limited by the appended claims on this patent.

What is claimed is:

1. A software-implemented method comprising:
    (a) developing a common branding theme through multiple slides and seamlessly generating a common appearance through said multiple slides wherein said multiple slides collectively comprise a unified presentation;
    (b) storing in a database a library of Model slides having specific attributes to corporate-based identifying and/or industry related themes;
    (c) adding shapes to Model slides having a common property set in compliance with a stored configuration file; and
    (d) classifying said shapes as either in compliance or non-compliant depending on whether a shape's associated property set matches a pre-set configuration file for that shape.

2. The method of claim 1 further comprising creating Title, Table of Content, and Standard Content slides.

3. The method of claim 1 further comprising automating a slide creation process.

4. The method of claim 3 further comprising fixing a linear toolbar horizontally across a display screen with plural slide management commands.

5. The method of claim 3 further comprising implementing tabs and/or icons for triggering programs to implement help assistant; insert selected shapes, and toggle between print and projection formats.

6. The method of claim 3 further comprising automatically positioning shapes on a slide.

7. The method of claim 1 wherein said database further comprises plural logo files.

8. The method of claim 1 wherein said database includes slide templates associated with at least one of: team pages tombstones, qualifications, copying pages and organizational charts.

9. A tangible computer readable medium having software stored thereon, the software having computer readable instructions which when executed by a computer, causes the computer to perform a method comprising:
    (a) developing a common branding theme through multiple slides and seamlessly generating a common appearance through said multiple slides wherein said multiple slides collectively comprise a unified presentation;
    (b) communicating with and searching a database storing a library of Model slides having specific attributes to corporate-based identifying and/or industry related themes;
    (c) adding shapes to Model slides having a common property set in compliance with a stored configuration file; and
    (d) classifying said shapes as either in compliance or non-compliant depending on whether a shape's associated property set matches a pre-set configuration file for that shape.

10. The tangible computer readable medium of claim 9, further comprising software for automatically creating Title, Table of Content, and Standard Content slides.

11. The tangible computer readable medium of claim 9, further comprising software are for automating a slide creation process.

12. The tangible computer readable medium of claim 11, further comprising software for fixing a linear toolbar horizontally across a display screen with plural slide management commands.

13. The tangible computer readable medium of claim 11 wherein said programming to automat a slide creation process includes slide management commands that implement tabs and/or icons for triggering programs to implement help assistant; insert selected shapes, and toggle between print and projection formats.

14. The tangible computer readable medium of claim 11, further comprising software for automatically positioning shapes on a slide.

15. The tangible computer readable medium of claim 9 wherein said database further comprises plural logo files.

16. The tangible computer readable medium of claim 9 wherein said database includes slide templates associated with two or more of: team pages, tombstones, qualifications, copying pages and organizational charts.

* * * * *